No. 772,196. PATENTED OCT. 11, 1904.
F. S. WARD.
EYEGLASSES.
APPLICATION FILED JAN. 30, 1903.
NO MODEL.

Witnesses
J. K. Shumway
Clara L. Weed.

Frederick S. Ward
Inventor
By Atty Seymour & Earle

No. 772,196.

Patented October 11, 1904.

UNITED STATES PATENT OFFICE.

FREDERICK S. WARD, OF NEW HAVEN, CONNECTICUT.

EYEGLASSES.

SPECIFICATION forming part of Letters Patent No. 772,196, dated October 11, 1904.

Application filed January 30, 1903. Serial No. 141,110. (No model.)

*To all whom it may concern:*

Be it known that I, FREDERICK S. WARD, of New Haven, in the county of New Haven and State of Connecticut, have invented a new and useful Improvement in Eyeglasses; and I do hereby declare the following, when taken in connection with the accompanying drawings and the letters of reference marked thereon, to be a full, clear, and exact description of the same, and which said drawings constitute part of this specification, and represent, in—

Figure 1:
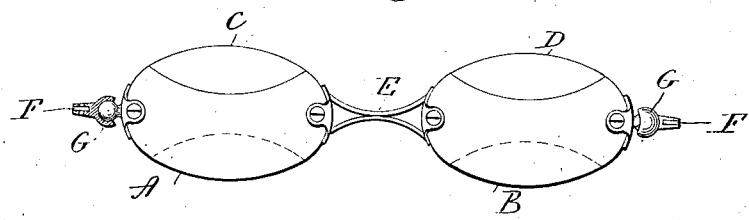
Figure 2:
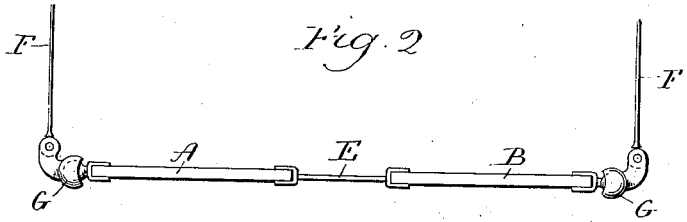

Figure 1, a front view of a pair of spectacles constructed in accordance with my invention, connection at one end between the lens and the temple being shown in section; Fig. 2, a top view of the same.

This invention relates to an improvement in bifocal eyeglasses; and by the term "eyeglasses" I mean to be understood as including glasses which are provided with temples and commonly known as "spectacles" or those which are connected with a nose-guard and commonly called "eyeglasses."

In the ordinary use of bifocal glasses the segments for near work are arranged in the lower edge of the lenses, necessitating in many cases that the wearer raise the head in order to look through the distance-glasses The object of this invention is to so mount the lenses that they may be revolved in the frames, so that the segments may be worn at the top of the lenses or at the bottom, as may be desired; and the invention consists in the construction as hereinafter described, and particularly recited in the claim.

The lenses A B are the usual lenses and arranged in connection with segments C D in the usual manner. For spectacles, as shown in Figs. 1 and 2 of the drawings, the lenses are connected by double reversely-bowed bridges E, and these lenses are connected with the temples F by ball-and-socket joints G. As shown in Fig. 1 of the drawings, the lenses are arranged with the segments at the top and so that the wearer conveniently looks through the distance-lenses; but the lenses may be readily turned in their bearings, so that the segments will stand at the bottom of the lenses, as indicated in broken lines, in which position they are in use for near work, the swivel-joint between the lenses and temples having sufficient friction to retain the lenses in either position.

While I have shown a ball-and-socket connection between the lens and the frame, it will be understood that any swivel connection may be employed which will frictionally hold the lenses in the desired position and permit them to be revolved, so as to turn the segments from the top to the bottom of the lenses.

I am aware that bifocal lenses have been mounted in frames adapted to be turned so as to reverse the position of the segment, and do not, therefore, wish to be understood as claiming, broadly, such as my invention.

Having fully described my invention, what I claim as new, and desire to secure by Letters Patent, is—

The herein-described bifocal glasses the lenses of which are connected by a double bridge and swivelly connected with temples, the connection with the temple being in line with the central horizontal axis of the lenses whereby the lenses may be revolved to cause the segments to stand at the top or bottom of the lenses without changing the vertical elevation of the lenses, substantially as described.

In testimony whereof I have signed this specification in the presence of two subscribing witnesses.

FREDERICK S. WARD.

Witnesses:
FREDERIC C. EARLE,
CLARA L. WEED.